PARALLEL ADDER

Filed June 30, 1960 2 Sheets-Sheet 1

INVENTOR.
RODERICK A. COOPPER

BY Sughrue, Rothwell, Mion & Zinn
ATTORNEYS

April 24, 1962 R. A. COOPPER 3,031,140

PARALLEL ADDER

Filed June 30, 1960 2 Sheets-Sheet 2

INVENTOR.
RODERICK A. COOPPER

BY

ATTORNEYS

United States Patent Office 3,031,140

Patented Apr. 24, 1962

3,031,140

PARALLEL ADDER

Roderick A. Coopper, Hyde Park, N.Y., assignor to International Business Machines Corporation, New York, N.Y., a corporation of New York Filed June 30, 1960, Ser. No. 40,006

5 Claims. (Cl. 235—175)

This invention relates to a parallel pulse adder of the type provided with inter-stage complementary carry lines and more particularly to one in which provision is made to compensate for carry ripple time.

In a parallel adder for adding binary numbers, each adder stage simultaneously adds a bit of the augend to a bit of the addend for each significant position and, in the case of inter-stage complmentary carry lines as here, a carry or no carry bit from the previous stage to provide a sum and carry or no carry as the case may be. Each stage has a determinable time delay which is a function of the circuit and its components so that the carry ripple time which accumulates from stage to stage becomes an important factor. The time delay is substantially the same for each stage and consequently it can be seen that carry ripple time will accumulate from the least to the most significant stage. Since we are here dealing with a pulse adder, the bits are fed to each stage simultaneously during bit time for each cycle and a number of cycles is employed sufficient to complete the addition in the last stage. If it is assumed that the per stage delay is $d$ and the pulse width is $p$ it can be seen that when the carry ripple time $nd$ (where $n$ equals the number of stages) approximates or exceeds $p$, erroneous results may be obtained. This is due to the fact that an addition may be performed in a stage without including a carry bit from the preceding stage since said carry will arrive at said stage after the bit pulses thereto have expired or at least decayed sufficiently to prevent proper addition.

For example, let it be considered that $p=30$ microseconds and $d=10$ microseconds. It can be seen that after three stages the carry ripple time amounts to 30 microseconds. The carry from the third stage will then enter stage four as the number bits thereto are expiring. By the application of the present invention to such an example, the entry of the carry bit produced by the third stage into the fourth stage will be delayed until the next cycle.

It is therefore an object of this invention to provide a parallel pulse adder with provision for compensating for carry ripple time.

It is another object of this invention to provide such an adder in which the carry bit transfer from one stage to the next is delayed when the carry ripple time due to said one stage and those preceding it has accumulated to a magnitude approximating the pulse width of the number bits.

Other objects will become apparent from a more detailed description of the accompanying drawings.

Figures 1, 2:
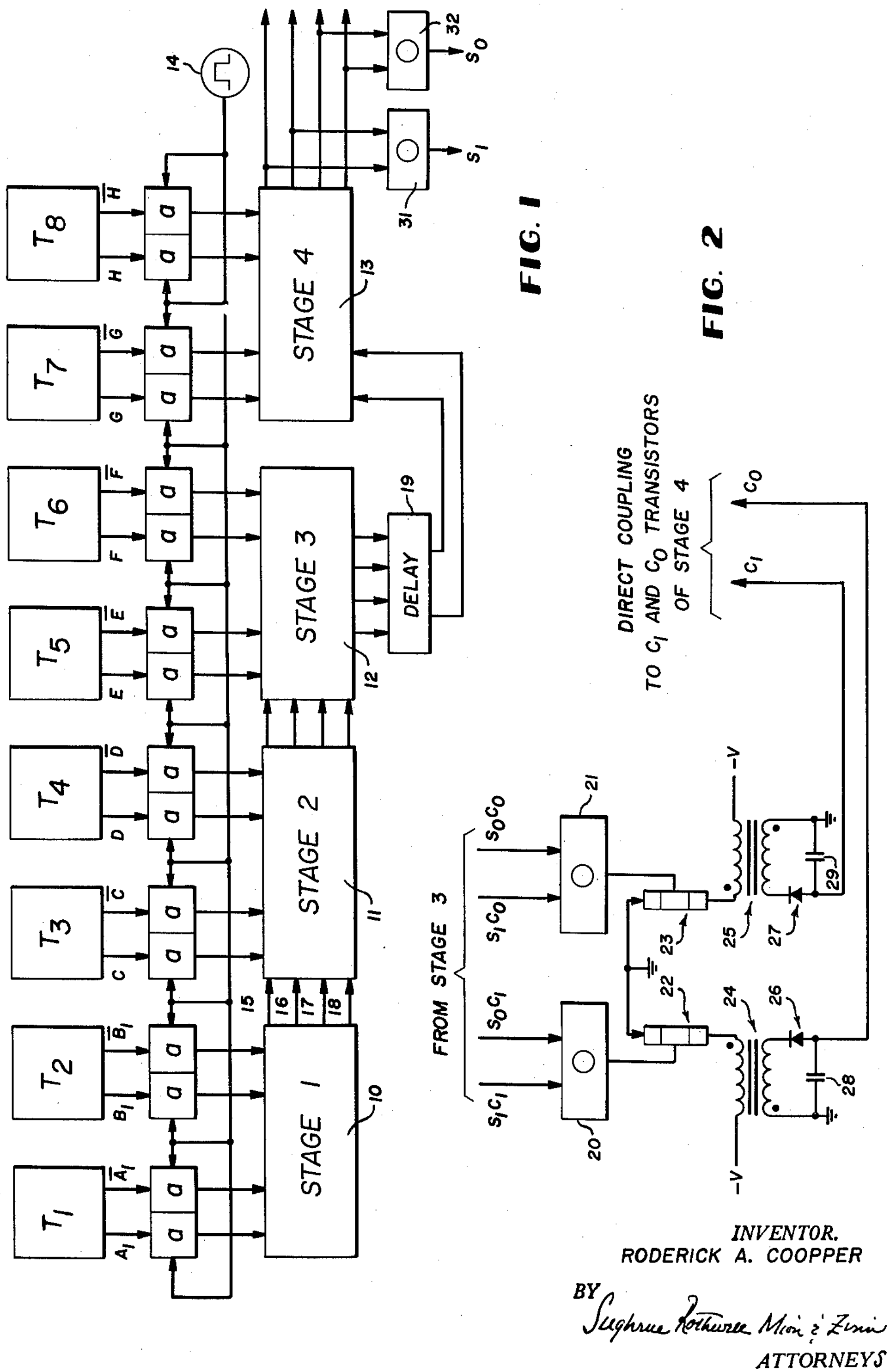
FIGURE 1 is a diagrammatic representation of a multi-stage parallel pulse adder illustrative of the invention.
FIGURE 2 is a circuit diagram of one form of pulse stretcher which may be used in accordance with this invention.

Referring first to FIGURE 1, $T_1$ through $T_8$ are representative of two state devices providing true and complement outputs. Such a device may be a conventional flip-flop of the dynamic or static type providing true and complement outputs. Numerals 10, 11, 12 and 13 represent four stages of a parallel pulse adder. A pulse generator 14 generates a pulse during bit time of each cycle and this pulse is fed to one input to each of the AND gates *a*. It can be seen then that the first stage will handle the least significant bits of the addend and augend of the two binary numbers being added by the adder. A pulse will appear on the $A_1$ or the $\overline{A}_1$ and $B_1$ or $\overline{B}_1$ lines. Since this is stage 1 of the adder there will of course be no carry input thereto. The addition in stage 1 will produce a pulse on one of the four lines at the output thereof. These lines are numbers 15, 16, 17 and 18 and respectively refer to sum 1 carry 1 ($S_1C_1$), sum 0 carry 1 ($S_0C_1$), sum 1 carry 0 ($S_1C_0$) and sum 0 carry 0 ($S_0C_0$). The carry from stage 1 is introduced into stage 2 where it enters into the addition of operands C and D.

Let it now be considered for illustration purposes that the pulse width of the pulses entering into stage 1 is 30 microseconds due to any means such as the pulse width of the pulses generated by pulse generator 14. Let it also be considered that the inherent time delay of each stage is 10 microseconds. If the start of the addition is at time 0 then the bits entering stage 1 will occupy time 0 through time 30 microseconds. The carry pulse at the output of stage 1 will occur between time 10 and time 40 microseconds. This is sufficiently timely to enter into the addition performed by stage 2. The carry output from stage 2 will occupy time 20 through time 50 microseconds which is sufficiently soon to enter into the addition performed by stage 3. However, it can be seen that the carry ripple time which has accumulated at the output of stage 3 would provide the carry therefrom at from time 30 through time 40 microseconds. Since the entry of the bits to stage 4 is from time 0 through time 30 microseconds it can be seen that a direct transfer of the carry from stage 3 to stage 4 would mean that the said carry would be introduced thereto at the expiration of the bits entering stage 4. Consequently, in accordance with this invention the carry outputs from stage 3 are fed to the delay circuit 19. This circuit is shown in detail in FIGURE 2.

Referring to FIGURE 2, the four-line output from stage 3 includes the $S_1C_1$ and $S_0C_1$ lines which are fed to OR gate 20 and the $S_1C_0$ and $S_1C_1$ lines which are fed to OR gate 21. The output of OR gate 20 is fed to the base of transistor 22 and that of OR gate 21 to the base of transistor 23. One or the other of these two transistors will conduct to carry from stage 3. Transformer 24 provides a pulse to delay circuit including diode 26 and condenser 28 and transformer 25 to delay circuit including diode 27 and condenser 29. The $C_1$ and $C_0$ output lines are directly connected to the $C_1$ and $C_0$ transistors of stage 4, respectively.

The diode and condenser are chosen so as to hold the charge on the condenser sufficiently long so as to overlap bit time of the next cycle but not long enough to overlap two succeeding cycles. Any convenient circuit components may be used.

The second cycle will be initiated by the second pulse produced by the generator 14. This pulse will reintroduce the operands G and H to stage 4. Due to the stretching of the carry pulse, said carry will overlap with the entry thereto of operands G and H.

The addition in stages 1, 2 and 3 will be accomplished during the first cycle and the addition in stage 4 during the second cycle. A sufficient number of cycles is allowed to complete the addition in the final stage. As shown in connection with stage 4, the $S_1$ outputs are fed to OR gate 31 and the $S_0$ outputs to OR gate 32. Similar OR gates are provided between each of the stages. In this particular case, the output of OR gates 31 and 32 will indicate the sum produced in stage 4.

Figure 3:
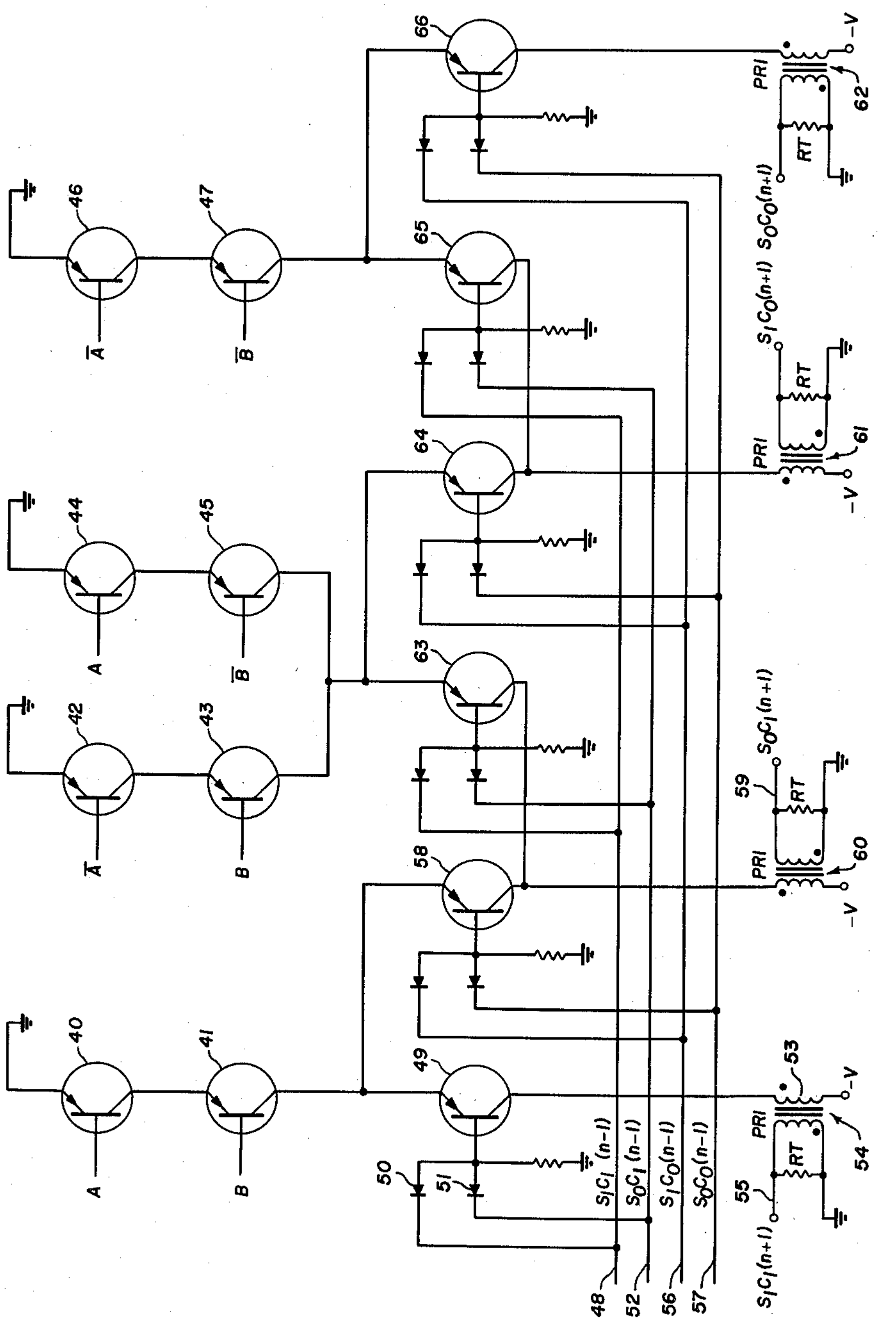
FIGURE 3 is a circuit diagram of one form of adder stage that may be employed.

As previously stated, $T_1$ through $T_8$ may be dynamic or static flip-flops. As actually illustrated these are standard flip-flops employing sampled AND gates at the complementary outputs thereof to provide the inputs to each of the stages. However, if a dynamic flip-flop of the circulating type is employed these gates may be eliminated. Additionally, while the present emphasis has been placed on an adder this term is used in a sense to cover an arithmetic circuit which can perform subtraction. In this case, the usual method of complementing one of the operands followed by addition may be employed. Also, while the term carry has been used in connection with an adder it is obvious that ripple time for a borrow can be similarly compensated for in a subtraction system. The carry, as illustrated here, is transferred inter-stage by four lines. This is because of a particular type of pulse adder circuit which will later be described. However, it should be noted that the circuit functions just as well with a two-line carry transfer, one for a carry and another for a no carry ignoring whether or not the sum is a 1 or a 0. The type of circuit illustrated in FIGURE 2 works best for inter-stage carry where delay is involved. However, with reference to the four-line inter-stage carry transfer reference is now made to FIGURE 3 showing one particular type of adder circuit which may be employed in accordance with the present invention.

This circuit diagram shows the *n*th stage of a parallel pulse adder of the transistorized type. Four possible combinations of inputs are handled by transistors 40 through 47, inclusive. If it is now assumed that the input to the *n*th stage is A and B it can be seen that transistors 40 and 41 are turned on. If the addition in a previous stage resulted in a sum of 1 and a carry of 1 this carry will appear as a pulse on line 48. The base of transistor 49 is connected through a diode OR gate composed of the diodes 50 and 51 to lines 48 and 52. Since the carry bit from the previous stage occurs on line 48 and transistors 40 and 41 are conducting, transistor 42 will conduct to provide current to the primary 53 of transformer 54. Due to the coupling as shown between the primary and secondary transformer 54 a negative pulse will appear at the output of the secondary of this transformer on line 55 which is indicated as $S_1C_1(n+1)$. This line, of course, connects to the next stage of the adder. Therefore, it can be seen that with a carry of 1 appearing on either line 48 or 52 and with entry of bits A and B there will be an output on line 55. If the entry was bit A and bit B with no carry from the previous stage either on line 56 or 57 then transistor 58 would be turned on. This would provide an output pulse on line 59 from transformer 60 to indicate a $S_0C_1(n+1)$. Similar logic can be applied with any other combinations of A and B to provide an output from any of the transformers 54, 60, 61, or 62. These outputs provide the carry inputs to the next stage. With reference to FIGURE 2, the $C_1$ transistors are 49, 63 and 65 and the $C_0$ transistors are 58, 64 and 66. No diodes such as 50 and 51 are used in this event.

A Start Add pulse is provided to a $C_0$ line in stage 1 to commence the addition. This may come from generator 14.

It should be noted that with the circuits shown, the carry stretching capacitors will be discharged by operation of the succeeding adder section when the addend and augend signals are applied to the latter, and this further simplifies and reduces timing problems. While microsecond values have been set forth for convenience in explaining operation of the adder system, this is not intended to be limiting; the circuits shown can be very fast so that the values stated could equally well be millimicroseconds.

What has been shown and described are various embodiments of the present invention. Other embodiments obvious to those skilled in the art are contemplated to be within the spirit and scope of the following claims.

What is claimed is:

1. A multistage parallel bit pulse adder having true and complement carry bit transfer means between stages thereof that comprises means to apply augend and addend bits to each stage thereof once each cycle during bit time thereof and means to delay transfer of said carry bit into at least a selected one of said stages from one cycle to the bit time of the next cycle.

2. A multistage parallel bit pulse adder having true and complement carry bit transfer means between stages thereof wherein each stage accumulates carry ripple time that comprises means to apply augend and addend bits to each stage thereof once each cycle during bit time thereof and means to delay transfer of said carry bit from one of said stages to the next succeeding stage from one cycle to the bit time of the next cycle.

3. A multistage parallel bit pulse adder as claimed in claim 2 wherein said bit pulses have a time duration of $p$, each of said stages contributes time $d$ to said carry ripple time, said one stage being selected wherein $nd$ approximately equals $p$ where $n$ is the number of stages contributing to said carry ripple time.

4. A multistage adder as defined by claim 2 wherein said carry bit transfer means includes sum 1 carry 0, sum 0 carry 0, sum 1 carry 1 and sum 0 carry 1 lines in which said means to delay transfer comprises means to OR said carry 1 lines, means to OR said carry 0 lines, means to delay the outputs of said OR means and means to couple said delayed carries to said next succeeding stage.

5. A multistage parallel bit pulse adder having true and complement carry bit transfer means between stages thereof wherein each stage accumulates carry ripple time that comprises means to apply operand bits to each stage thereof once each cycle during bit time thereof and means to stretch transfer of said carry bit from one of said stages resulting from full add during one cycle to the bit time of the next cycle, whereby the stretched carry is available with the operands in the next succeeding stage.

No references cited.